United States Patent
Günther et al.

[11] 3,829,181
[45] Aug. 13, 1974

[54] COMBINED AXIAL RADIAL BEARING

[75] Inventors: Fritz Günther, Stuttgart-Rohr; Hermann Fritz, Merklingen, both of Germany

[73] Assignee: SKF Industrial Trading and Development Company B.V., Overtoom, Amsterdam, Netherlands

[22] Filed: Mar. 12, 1973

[21] Appl. No.: 340,590

[30] Foreign Application Priority Data
Mar. 14, 1972 Germany............................ 7209652

[52] U.S. Cl. ............................................... 308/174
[51] Int. Cl. ............................................. F16c 19/14
[58] Field of Search............................. 308/174, 234

[56] References Cited
UNITED STATES PATENTS
3,341,263 9/1967 Pitner................................. 308/174

Primary Examiner—Charles J. Myhre
Assistant Examiner—Frank Susko
Attorney, Agent, or Firm—Murray Schaffer

[57] ABSTRACT

A combined axial-radial bearing comprising a housing having a cylindrical portion and a radially extending flange portion. An axial bearing is located in said flange portion, comprising an array of needle roller elements and a buffer disk interposed between the roller elements and the flange. The frontal face of the buffer disk lying in opposition to said flange is formed with camber means by which the disk is spaced from the flange and which permits angular movement therebetween.

6 Claims, 2 Drawing Figures

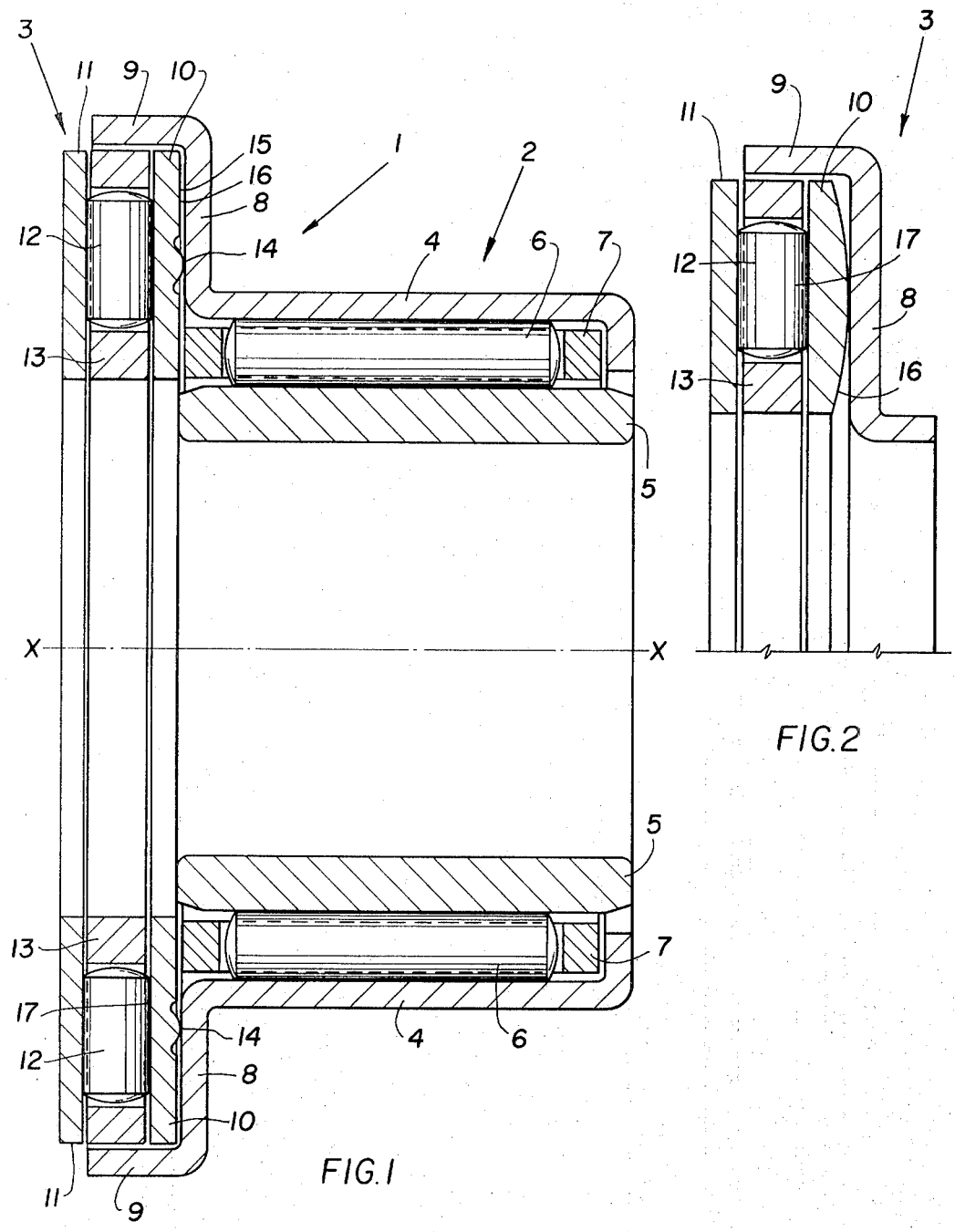

COMBINED AXIAL RADIAL BEARING

BACKGROUND OF THE INVENTION

The present invention relates to a combined axial-radial needle bearing having a planar radial flange forming a part of the housing, and a buffer disk interposed between the flange and the array of needle rollers forming the axial bearing.

Combined axial-radial bearings are known in which needle elements or roller elements are used as the bearing bodies and a bushing housing is provided having a radial collar for supporting the axial bearing. A flat planar rolling disk lies against this collar. This planar disk enables only a very limited degree of angular or tilting movement between the axial bearing and the radial bearing. As a result, the known combined axial-radial bearings having the disadvantage that the bushing most be made in a very complex manner and that during installation of such bearings, the forces and stress upon the bushing are so great, that the bushing may be deformed to such a degree that the precise and accurate axial tolerance of the bearing could not be maintained.

It is the object of the present invention to provide a combined axial-radial needle bearing which overcomes the disadvantages of the prior art.

It is a further object of the present invention to provide a combined axial-radial needle bearing in which a buffer disk is provided which is angular movable and tiltable.

It is still another object of the present invention to provide a combined axial-radial needle bearing in which the buffer disk is adjustable to compensate for variances in installation.

These objects, others and numerous advantages will be seen from the following disclosure.

SUMMARY OF INVENTION

According to the present invention the foregoing objects are briefly attained by providing a buffer disk having its frontal side face lying opposite to the radial flange of the housing, provided in cross section with camber means which spaces the disk from the flange and which allows the disk to move or tilt with respect to the flange or the axis of rotation.

It has been known to provide buffer disks having convexed curved race surfaces, whereby only the end pressure on the needle elements was avoided by the nonuniform loading and an adjustability of the buffer disk was not obtained. In contrast, in the present invention, the needle elements abut against a planar or flat race surface formed by the buffer disk. The adjustment of the bearing is thus less complicated and the arrangement of the buffer disk within the radial flange portion of the housing assured in a more simple manner.

In one form of the invention the buffer disk is provided on its frontal face with at least one cross sectional projection extending from an otherwise planar surface. Preferably the projection extends annular about the face although it may be provided in one or more parts lying in selected sectors of the face. Such an arrangement is very economical to make and serves to easily obtain all of the aforementioned objects and advantages. In another form the frontal face is made with a convex crown which also serves as the spacer or camber means.

Full details of the present invention are given in the following description of the preferred embodiment thereof and are shown by way of example in the accompanying drawings.

BRIEF DESCRIPTION OF DRAWINGS

In the drawings:

FIG. 1 is an axial section through a combined axial radial bearing embodying the present invention; and FIG. 2 is a similar view of FIG. 1 showing a modified version of the invention.

DESCRIPTION OF INVENTION

Turning to FIG. 1 there is shown one form of a combined Axial-Radial bearing according to the present invention generally defined by the numeral 1, comprising a radial bearing 2 and an axial bearing 3. The bearing is formed with a unitary housing which provides the outer cylindrical race ring 4 for the radial bearing. An inner race ring 5 is provided spaced from ring 4 between which are arranged a plurality of needle roller elements 6 held by a cage 7. Extending radially outward at one end as an integral portion of the housing is a flange 8 forming the housing for the radial bearing 3. The flange lies in a plane perpendicular to the axis $x-x$ of rotation and terminates in an annular skirt 9 parallel to the axis of rotation $x-x$. The axial bearing 3 comprises an inner buffer disk or thrust washer 10, an outer shaft disk or washer 11, and a plurality of needle roller elements 12 held in a cage 13. The axis of the needle roller elements 12 extend parallel to the plane of the flange 8 and radially with respect to the axis of rotation $x-x$. The frontal face of the buffer disk 10 is provided with camber means engaging the flange 8. The camber means seen in FIG. 1 comprises a projection 14 extending from an other planar or flat face 15 from the side 16 of the buffer disk lying opposite to the flange 8. The other face of the buffer disk forming the race surface for the needle elements is flat or planar. The projection 14 allows the buffer disk 10 to be spaced from the flange 8 and to be permitted a degree of angular movement with respect to the flange. The projection 14 preferably extends about the entire periphery of the buffer disk 10 at approximately its radial center and forms on the disk 10 a ring-like or annular band. In particular applications, the projection 14 may be formed only on portions of the periphery of the buffer disk, as for example in selected arcuate sectors.

In FIG. 2, the bearing show in FIG. 1 is somewhat modified as to the camber means. Similar parts, however, bear similar reference numerals. In this Figure, the rear side 16 of the buffer disk 10 is formed with a convex crown, while the inner side 17 which comes into contact with the needle elements 12 remains planar and flat as in FIG. 1. The crown side 16 enables the buffer disk 10 to have its degree of angular movement or tilt with respect to the axis of rotation.

It will be seen from the foregoing that the device according to the present invention permits the axial bearing portion a degree of lateral movement or tilting allowing it to easily compensate for the stress and forces occurring in installation and use. The camber means may be provided in various forms. From the disclosure given, those skilled in the art will now, no doubt, realize other ways of forming a projection, crown or the equivalent. The race surface of the buffer disc is planar and therefore capable of absorbing various directional load components.

Since various modifications and changes are possible, it is intended that the present disclosure be taken as illustrative only, and not limiting of the scope of the present invention.

What is claimed:

1. A combined axial-radial bearing comprising a housing having a cylindrical portion and a radially extending planar flange portion, an axial bearing located in said flange portion, said axial bearing comprising an array of needle roller elements and a buffer disk interposed between said roller elements and said flange, the frontal face of said buffer disk lying in opposition to said flange being formed with camber means for spacing said disk from said flange and for permitting angular movement of said disk with respect to said flange.

2. The axial-radial bearing according to claim 1 wherein said frontal face of said buffer disk is provided with a convex crown to form said camber means.

3. The axial-radial bearing according to claim 1 wherein said frontal face of said buffer disk is flat and is provided with an outward projection to form said camber means.

4. The axial-radial bearing according to claim 1 wherein said projection extends annularly about said frontal face.

5. The axial-radial bearing according to claim 1 including a radial bearing located in said cylindrical portion of said housing.

6. The axial-radial bearing according to claim 1 wherein the race surface of said buffer disk is planar.

* * * * *